(12) United States Patent
Kumar et al.

(10) Patent No.: US 8,761,439 B1
(45) Date of Patent: Jun. 24, 2014

(54) METHOD AND APPARATUS FOR GENERATING THREE-DIMENSIONAL POSE USING MONOCULAR VISUAL SENSOR AND INERTIAL MEASUREMENT UNIT

(75) Inventors: Rakesh Kumar, West Windsor, NJ (US); Supun Samarasekera, Princeton, NJ (US); Taragay Oskiper, East Windsor, NJ (US)

(73) Assignee: SRI International, Menlo Park, CA (US)

( * ) Notice: Subject to any disclaimer, the term of this patent is extended or adjusted under 35 U.S.C. 154(b) by 289 days.

(21) Appl. No.: 13/217,014

(22) Filed: Aug. 24, 2011

(51) Int. Cl.
*G06K 9/00* (2006.01)
(52) U.S. Cl.
USPC .......................................... 382/103; 382/154
(58) Field of Classification Search
None
See application file for complete search history.

(56) References Cited

U.S. PATENT DOCUMENTS

| | | | |
|---|---|---|---|
| 5,629,988 A | 5/1997 | Burt et al. | |
| 7,359,526 B2 | 4/2008 | Nister | |
| 7,925,049 B2 * | 4/2011 | Zhu et al. | 382/103 |
| 8,305,430 B2 * | 11/2012 | Oskiper et al. | 348/47 |

OTHER PUBLICATIONS

Bleser, Gabriele, and Didier Stricker. "Advanced tracking through efficient image processing and visual—inertial sensor fusion." Computers & Graphics 33.1 (2009): 59-72.*
"Stable Vision-aided Navigation for Large-Area Augmented Reality", Taragay Oskiper, Han-Pang Chiu, Zhiwei Zhu, Supun Samaresekera, Rakesh Kumar, IEEE Virtual Reality 2011, Mar. 19-23, Singapore, pp. 63-70.
"A Kalman Filter-based Algorithm for IMU-Camera Calibration: Observability Analysis and Performance Evaluation", F.M. Mirzaei and S.I. Roumeliotis, IEEE Transactions on Robotics, 24(5), Oct. 2008, pp. 1143-1156.

* cited by examiner

*Primary Examiner* — Shefali Goradia
(74) *Attorney, Agent, or Firm* — Moser Taboada

(57) ABSTRACT

An apparatus for providing three-dimensional pose comprising monocular visual sensors for providing images of an environment surrounding the apparatus, an inertial measurement unit (IMU) for providing gyroscope, acceleration and velocity information, collectively IMU information, a feature tracking module for generating feature tracking information for the images, and an error-state filter, coupled to the feature track module, the IMU and the one or more visual sensors, for correcting IMU information and producing a pose estimation based on at least one error-state model chosen according to the sensed images, the IMU information and the feature tracking information.

23 Claims, 5 Drawing Sheets

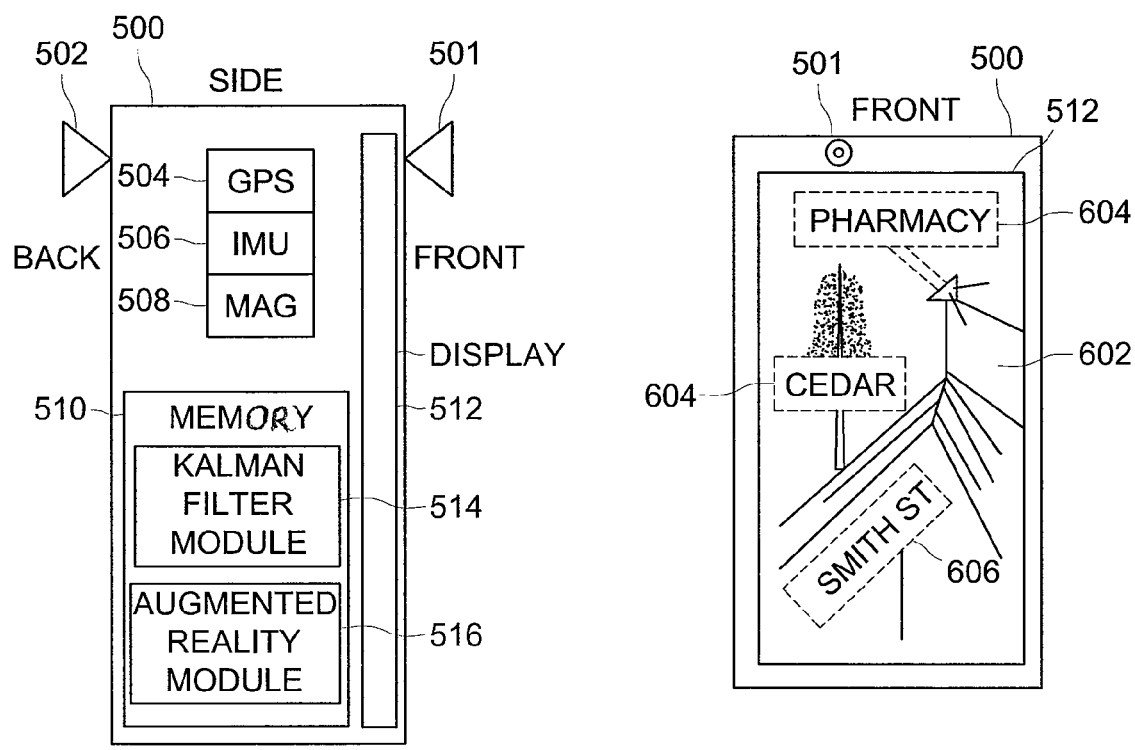
FIG. 5
FIG. 6
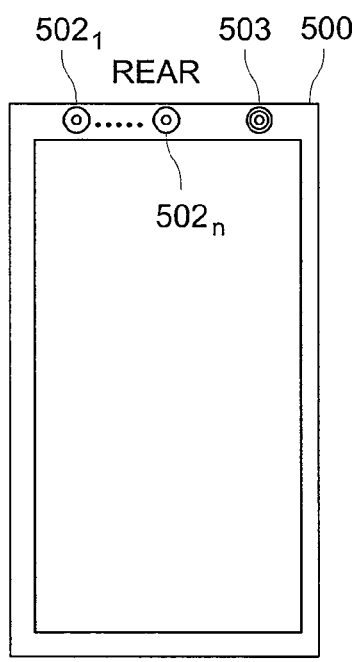
FIG. 7

METHOD AND APPARATUS FOR GENERATING THREE-DIMENSIONAL POSE USING MONOCULAR VISUAL SENSOR AND INERTIAL MEASUREMENT UNIT

GOVERNMENT RIGHTS IN THIS INVENTION

This invention was made with U.S. government support under contract number FA9200-07-D-0045/0016. The U.S. government has certain rights in this invention.

BACKGROUND OF THE INVENTION

1. Field of the Invention

Embodiments of the present invention generally relate to three-dimensional navigation systems and, more particularly, to a method and apparatus for generating three-dimensional pose using a monocular visual sensor and an inertial measurement unit.

2. Description of the Related Art

Traditional approaches for computing pose estimations for devices using monocular visual sensors (e.g., single lens cameras) and an inertial measurement unit relied on computing a pose estimate from visually tracked features of a scene and building a measurement model, based on the pose estimate. This traditional method led to scale ambiguity problems, as actual scale could not be determined properly from the features as well as problems with uncertainty propagation due to the highly non-linear nature of pose estimation from monocular feature correspondences over several frames. Typically, pose covariance estimation is obtained via back propagation of the covariance method, where the goal is to deduce the uncertainty in the pose estimate from the covariance of the feature correspondences. However, in such a framework, measurement uncertainty is severely underestimated due to non-linearities. Outlier feature rejection becomes problematic, since, in order to reject bad pose measurements, one needs a mechanism to compare the predicted pose against the measurement, and the measurement suffers from a poor uncertainty model.

Real-time tracking by fusing information available from visual and inertial sensors (e.g., an inertial measurement unit (IMU)) has been studied for many years with numerous applications in robotics, vehicle navigation and augmented reality. However, it is still unclear how to best combine the information from these complementary sensors. Since inertial sensors are suited for handling situations where vision is lost due to fast motion or occlusion, many researchers use inertial data as backup or take only partial information (gyroscopes) from an IMU to support vision-based tracking systems.

To better exploit inertial data, several researchers use an extended Kalman filter to fuse all measurements uniformly to a pose estimate. These systems combine the filter with vision-tracking techniques based on artificial markers, feature points, or lines. Results from these Kalman filter-based systems indicate that using vision measurements effectively reduce the errors accumulated from IMU. However, these systems have not eliminated the problem of measurement uncertainty and scale ambiguity.

Therefore, there is a need in the art for improved pose computation using a method and apparatus for generating three-dimensional pose using a monocular visual sensor and an inertial measurement unit (IMU).

SUMMARY OF THE INVENTION

Embodiments of the present invention comprise an apparatus for providing three-dimensional pose comprising monocular visual sensors for providing images of an environment surrounding the apparatus, an inertial measurement unit for providing gyroscope, acceleration and velocity information, collectively IMU information, a feature tracking module for generating feature track information for the images, and an error-state filter, coupled to the feature track module, the IMU and the one or more visual sensors, for correcting IMU information and producing a pose estimation based on at least one error-state model chosen according to the sensed images, the IMU information and the feature tracking information.

Further embodiments of the present invention comprise a computer implemented method for generating a three-dimensional pose estimation comprising sensing images of a surrounding environment using a monocular visual sensor, providing gyroscope, acceleration and velocity information, collectively IMU information, tracking features in the images for providing inliers of the images, and generating an error correction for the IMU information and a pose estimation based on the sensed images, the IMU information and the inliers of the images.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates the apparatus of FIG. 1 implemented as a mobile device in a side view in accordance with at least one embodiment of the present invention;

FIG. 6 illustrates the apparatus of FIG. 1 implemented as a mobile device in a front view in accordance with at least one embodiment of the present invention; and FIG. 7 illustrates the apparatus of FIG. 1 implemented as a mobile device in a rear view in accordance with at least one embodiment of the present invention.

DETAILED DESCRIPTION

Embodiments of the present invention generally relate to generating a three-dimensional pose estimation using a monocular visual sensor and an IMU. In an exemplary embodiment, the present invention uses one or more monocular visual sensors to obtain images of a scene, tracks features in the scene to reject outliers and uses an inertial measurement unit, a global tracking unit and a magnetometer to read measurements coupled to an error-state predictive filter to generate error constraints. These error constraints coupled with the feature tracking assist the IMU, the global tracking unit and the magnetometer in calculating a more accurate final pose estimation of the visual sensor using six degrees of freedom (6dof).

Figure 1:
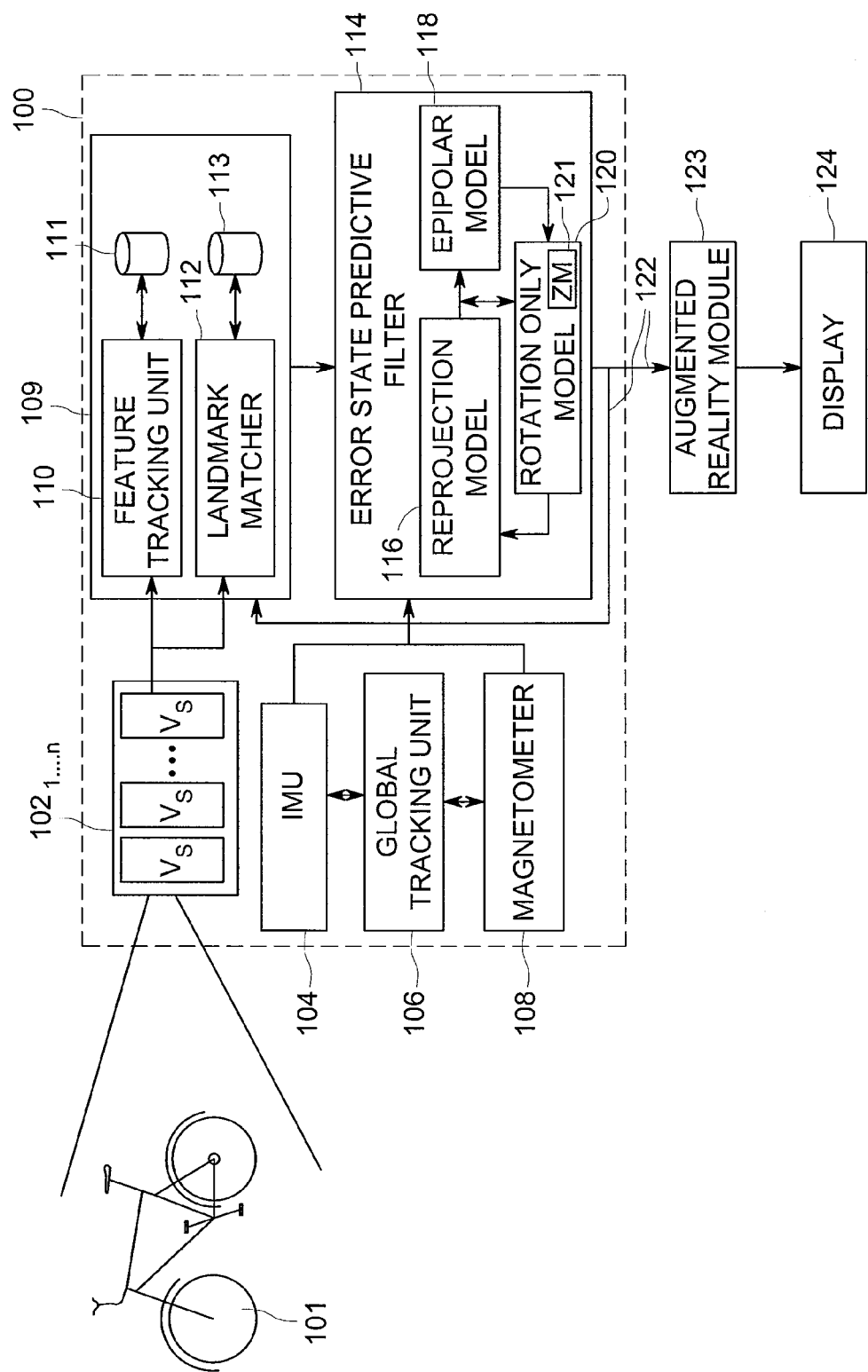
FIG. 1 depicts a functional block diagram of an apparatus for generating three-dimensional pose using a monocular visual sensor and an inertial measurement unit in accordance to an exemplary embodiment of the present invention.

FIG. 1 depicts a functional block diagram of an apparatus 100 for generating three-dimensional pose using a monocular visual sensor and an inertial measurement unit in accordance with an exemplary embodiment of the present invention. The apparatus 100 comprises one or more visual sensors $102_{1...n}$, an inertial measurement unit (IMU) 104, a global tracking unit 106, a magnetometer 108, a feature tracking unit 110 with a feature database 111, a landmark matcher 112 with a landmark database 113, an error-state filter 114 with error-state models 116, 118 and 120.

In accordance with an exemplary embodiment of the present invention, the scene 101 is sensed by the monocular visual sensor 102 and transmitted to pre-processor 109. In some embodiments, a plurality of monocular visual sensors $102_{1...n}$ may be used. The preprocessor 109 employs the feature tracking unit 110 to compute a five-point relative pose estimation over three frames using the feature database 111. The process to compute a five-point relative pose estimation is described in commonly assigned U.S. Pat. No. 7,359,526 ('526), which is hereby incorporated by reference in its entirety in the present application. The pre-processor 109 also transmits the sensed images to the landmark matcher 112 to perform landmark matching in the image using the landmark database 113. Both the feature tracking unit 110 and the landmark matcher 112 are used to identify any outlier features and inlier features and report only the inliers to the error-state predictive filter module 114, further correcting any IMU information provided.

In accordance with another embodiment of the present invention, visual sensors $102_{1...n}$ comprise one or more monocular sensors and one or more electro-optical stereo sensors. In the case where a stereo sensor is used in addition to a monocular sensor, the monocular sensor along with the reprojection model can assist in establishing an accurate pose using measurements from the stereo sensor. In one embodiment of the invention, the visual sensors are a mix of both monocular and stereo cameras. The cameras may be infrared, visible, acoustic, or a combination thereof. Any sensor that provides images of the environment may find use as at least one of the visual sensors $102_{1...n}$.

In one embodiment, the IMU 104, as is well known in the art, comprises a gyroscope, and an acceleration measuring unit. In accordance with one of the embodiments of the present invention, the IMU is a MEMS type Crista IMU from Cloudcap. Depending on the IMU drift rate, the IMU 104 may require measurement updates more often, therefore measurements are expressed in terms of only previous and current states. In this manner, cloning of only the previous state is required, thus reducing the state vector dimensions maintained in the filter module 114 as well as reducing computation costs while providing sufficient accuracy, idealizing this IMU for real-time implementation.

In addition, in an exemplary embodiment, Harris corner features and correlation window based matching is used in order to comply with stringent real-time requirements of Augmented Reality Systems. However, often, visual tracking outages associated with low light or texture-less regions in the scene, increase uncertainty in the system since during these periods navigation relies solely on the IMU, leaving the system vulnerable to accepting erroneous outlier features in the scene 101 at the end of the outage. Therefore, a five-point camera pose estimation is used to reject outlier features before entering into the error-state predictive filter module 114. The five-point camera pose estimation calculation is described in U.S. Pat. No. 7,359,526, which is hereby incorporated by reference in its entirety herein. In addition, to enhance the operability of the apparatus 100 in real-time and in real-life situations where visual features are frequently lost and quick head movements occur, IMU 104 initialization and rapid bootstrapping to re-engage navigation after outages occur are prioritized using three different dynamically switched measurement models for the error-state predictive filter module 114.

The IMU 104 provides gyroscope, acceleration and velocity information, collectively IMU information, to the error-state predictive filter module 114. The global tracking unit 106 provides global coordinate based location information and the magnetometer 108 provides global magnetic field information to the error-state predictive filter module 114. In accordance with at least one exemplary embodiment of the present invention, the global tracking unit 106 is implemented as a global positioning system (GPS) device. The global location information is coupled with the IMU information for generating an accurate global position and heading fix. Once the filter module 114 receives all of the tracks of information from the feature tracking unit 110 and the landmark matcher 113, the IMU 104, the global tracking unit 106, and the magnetometer 108, the error-state predictive filter module 114 selects an error-state model to perform error calculations based on the provided information. In an exemplary embodiment of the present invention, the three error-state constraint models are the reprojection error constraint measurement model (reprojection model) 116, the epipolar constraint ('526 patent) based measurement model (epipolar model) 118 and the rotational-only or 2D parametric constraint measurement model (rotational-only model) 120. An example of the rotation-only or 2D parametric constraint model is described in U.S. Pat. No. 5,629,988 ('988), which is hereby incorporated by reference in its entirety herein. In accordance with at least one exemplary embodiment of the present invention, a subset of the rotation-only constraint measurement model 120 is the zero-velocity constraint measurement model.

The reprojection model 116 is used when the apparatus 100 is in a steady state, comprising low-error conditions from the IMU 104, the global tracking unit 106, the magnetometer 108, and the feature tracking unit 110. In the reprojection model, the 3D structure of points in the scene 101 is estimated using triangulation of rays from the camera center to track scene points in a sequence of images. Based on the 3D point estimates, two residuals along the x and y image coordinate axis are formulated as the difference between the tracked feature point on a normalized image plane of the scene 101 and a reprojection of its 3D location estimate on both the previous frame and the current frame using the predicted camera pose. The reprojection error is linearized with respect to small changes in the orientation and location error state components. After linearization, the two residual (x and y) errors for each point on the current and previous frame are stacked and expressed in terms of the current and previous orientation and location error state components. The 3D point that appears in the measurement equations via projection onto the left null-space is eliminated, having two residual errors for the same tracked feature point. The modified equations for all the tracks are stacked to form the final set of measurement model equations, which are a function of both the previous state and current predicted state, so they are relative measurements.

In order to handle the relative measurements in the error-state predictive filter module 114, a stochastic cloning framework is employed. Stochastic cloning, discussed below, provides for the processing of the relative measurements by augmenting the state vector with one evolving state estimate and one stationary state estimate. The evolving estimate is propagated by the process model and the stationary estimate is kept static. The error-state predictive filter module 114 is then modified to incorporate the joint covariance of the two clone states.

When the IMU 104, the global tracking unit 106, the magnetometer 108, and the feature tracking unit 110 are initializing, readings from these units have a high level of uncertainty associated with them. During initialization, the direction of motion information provides an adequate constraint for the IMU and six degrees of freedom are not necessary for pose estimation. Therefore, in order to establish the steady state, the filter module 114 uses the epipolar model 118, which uses motion information, pitch and roll from an accelerometer, and ground-relative orientation from a gyroscope in the IMU. While the pose is being estimated using the epipolar model, the apparatus 100 retries the reprojection model in order to ascertain whether the devices have initialized based on whether the reprojection errors fall below a certain threshold.

In the case where no translational motion is detected, i.e., either all the feature flow is caused by purely rotational motion, or there is very small feature displacement on the image plane for scene 101, the rotation-only model is employed. Therefore, this case also includes the zero-velocity model 121, but is a more general constraint model. The rotation-only model 120 is employed when triangulation cannot take place and direction cannot be ascertained. The zero-velocity model 121 only considers the case where there is no translation of the IMU whatsoever. In the zero-velocity model state, the IMU provides a very good estimate for camera orientation. The previous image and the current sensed image are compared and if there is no motion or very little motion, the zero-velocity model is used. Once apparatus 100 begins to move again, it is likely that the reprojection model will be employed again.

The error-state predictive filter module 114 produces a three-dimensional pose estimate 122 based on the three error constraint models in order to correct the IMU 104, the global tracking unit 106 and the magnetometer 108. The error-state predictive filter module 114 also may output the pose estimate to a display 124 where overlays of an image of the scene 101 and augmented reality notifications of a user's environment are shown to a user. In an exemplary embodiment, the display 124 is a display on a smart-phone mobile device. In another exemplary embodiment, the display 124 is on eyewear connected to the apparatus, where a user looks through the eyewear and views overlaid data on an image of the scene 101. Other embodiments of the apparatus 100 include, but are not limited to, using the apparatus 100 for unmanned aerial vehicles, tracking human movement, robotics and robotic vision.

The error-state predictive filter 114, in one embodiment an error-state Kalman filter, uses the signals from the preprocessor 109 to produce a three-dimensional pose estimate that is continuously updated as additional measurements are supplied to the preprocessor 109. The three-dimensional pose estimate is output on path 122. The error-state predictive filter 114 is used to fuse IMU information, the local measurements from a visual odometry process using one or more monocular cameras, global measurements from a visual landmark-matching process, global tracking information, IMU information and magnetic field information. The predictive filter 114 adopts a so called "error-state" formulation. The filter dynamics follow from the IMU error propagation equations that vary smoothly and therefore are more amenable to linearization. The measurements to the filter consist of the differences between the inertial navigation solution as obtained by solving the IMU mechanization equations and the external source data, which include the relative pose information provided by visual odometry process and global measurements provided by the visual landmark matching process.

In the predictive filter 114, denote the ground (global coordinate frame) to IMU pose as $P_{GI}=[R_{GI}\ T_{GI}]$ such that point $X_G$ expressed in the ground frame are transferred to the IMU coordinates by $X_I=R_{GI}X_G+T_{GI}$. Accordingly, $T_{GI}$ represents the ground origin expressed in the camera coordinate frame, whereas $T_{IG}=-R_{GI}^T T_{GI}$ is the location of the IMU in the ground coordinate frame. In order to determine the fixed relation between the IMU and the camera coordinate systems, which we refer to as the IMU to camera pose, $P_{IC}=[R_{IC}\ T_{IC}]$, an extrinsic calibration procedure is used. An example of this procedure is provided in F. M. Mirzaei and S. I. Roumeliotis, "A Kalman Filter-based Algorithm for IMU-Camera Calibration: Observability Analysis and Performance Evaluation", *IEEE Transactions on Robotics*, 24(5), October 2008, pp. 1143-1156. Accordingly, ground to camera pose is determined by the relation $P_{GC}=[R_{IC}\ R_{GI}+R_{IC}T_{GI}+T_{IC}]$.

In the predictive filter, denote the ground (global coordinate frame) to camera pose as $P_{GC}=[R_{GC}\ T_{GC}]$ such that point $X_G$ expressed in the ground frame are transferred to the camera coordinates $X_C=R_{GC}X_G+T_{GC}$. Accordingly, $T_{GC}$ represents the ground origin expressed in the camera coordinate frame, whereas $T_{CG}=-R_{GC}^T T_{GC}$ is the camera location in the ground coordinate frame.

The total (full) states of the filter consist of the camera location $T_{CG}$, a gyroscope bias vector $b_g$, velocity vector v in global coordinate frame, accelerometer bias vector $b_a$ and ground to camera orientation $q_{GC}$, expressed in terms of the quaternion representation for rotation. For quaternion algebra, the embodiment follows the notion and uses a frame rotation perspective. Hence, the total (full) state vector is given by $$s=[q_{GC}^T b_g^T v^T b_a^T T_{CG}^T]^T.$$

The state estimate propagation is obtained by the IMU mechanization equation using the gyroscope $\omega_m(t)$ and accelerometer $a_m(t)$ readings from the IMU between consecutive video frame time instants.

$$\dot{\hat{q}}_{GC}(t) = \left(\frac{1}{2}\right)(\hat{q}_{GC}(t) \otimes \hat{\omega}(t))$$

$$\dot{\hat{v}}(t) = \hat{R}_{GC}^T(t)\hat{a}(t) + g,$$

$$\dot{\hat{x}}(t) = \hat{v}(t), \dot{\hat{b}}_g(t) = 0, \dot{\hat{b}}_a(t) = 0$$

where $\hat{\omega}(t)=\omega_m(t)-\hat{b}_g(t)$, $\hat{a}(t)=a_m(t)-\hat{b}_a(t)$ and $\otimes$ is used to denote the quaternion product operation. The Kalman error state consists of:

$$\delta s=[\delta\theta^T \delta b_g^T \delta v^T \delta b_a^T \delta T_{CG}^T]^T$$

according to the following relation between the total state and its inertial estimate $$q_{GC} = \hat{q}_{GC} \otimes \delta q_{GC},\ \delta q_{GC} \simeq \left[1\ \frac{\delta\Theta^T}{2}\right]^T$$

$$b_g(t) = \hat{b}_g(t) + \delta b_g(t),\ b_a(t) = \hat{b}_a(t) + \delta b_a(t)$$

$$v(t) = \hat{v}(t) + \delta v(t),\ T_{CG}(t) = \hat{T}_{CG}(t) + \delta T_{CG}(t)$$

During filter operation, ground to IMU pose PGI is predicted prior to each update instant by propagating the previous estimate using all the IMU readings between the current and previous video frames via IMU mechanization equations. After each update, estimates of the errors (which form the error-states of the filter) are fed-back to correct the predicted pose before it is propagated to the next update and so on.

A Landmark matching database is discussed in commonly assigned U.S. patent application Ser. No. 13/18297, which is hereby incorporated by reference in its entirety in the present application. Given a query image, landmark matching returns the found landmark shot from the landmark matching database establishing the 2D to 3D point correspondences between the query image features and the 3D local point cloud, as well as the camera pose $P_{GL}$ belonging to that shot. First, every 3D local landmark point X is transferred to the global coordinate system via $$Y = R_{LG} X + T_{LG}$$

which are written under small error assumption as $$\hat{Y} + \delta Y \cong (1-[\rho]_x) \hat{R}_{LG} (\hat{X} + \delta X) + \hat{T}_{LG} + \delta T_{LG}$$

where $\rho$ is a small rotation vector. Neglecting second order terms results in the following linearization $$\delta Y \cong \hat{R}_{LG} \delta X + [\hat{R}_{LG} \hat{X}]_x \rho + T_{LG}$$

and letting $\tilde{X} = \hat{R}_{LG} \hat{X}$, and the local 3D point covariance $\Sigma_y$, can be represented in the global coordinate frame in terms of the local reconstruction uncertainty, $\Sigma_x$ and landmark pose uncertainty in rotation and translation $\Sigma R_{LG}$ and $\Sigma T_{LG}$, as $\Sigma_y \cong \hat{R}_{LG} \Sigma_x \hat{R}_{LG}^T + [\tilde{X}]_x \Sigma R_{LG} [\tilde{X}]_x^T + \Sigma T_{LG}$. After this transformation, the projective camera measurement model is employed such that for each 3D point Y obtained above and expressed in the current camera coordinate system as $Z=[Z_1 \ Z_2 \ Z_3]^T$, the projection onto the normalized image plane is given by $$z = f(Z) + v \text{ with } f(Z) = [Z_1/Z_3 \ Z_2/Z_3]^T$$

where v is the feature measurement noise with covariance $\Sigma_v$ and $Z = R_{GC} Y + T_{GC} = R_{GC}(Y - T_{CG})$.
Under small error assumption $\hat{Z} + \delta Z \cong (1 - [\delta \theta] x) \hat{R}_{GC}(Y + \delta Y - \hat{T}_{CG} - \delta T_{CG})$.
Hence, $\delta Z \cong [\hat{R}_{GC}(\hat{Y} - \hat{T}_{CG})]_x \delta \theta + \hat{R}_{GC}(\delta Y - \delta T_{CG})$.
Accordingly, the measurement equation in the error states is given by $$\delta z_L \cong H_L \delta s + \eta$$

where the measurement Jacobian $$H_L = J_f [J_\theta 0_{3\times3} 0_{3\times3} 0_{3\times3} J_{\delta TCG}]$$

with $$J_f = \begin{bmatrix} 1/\hat{Z}_3 & 0 & -\hat{Z}_1/\hat{Z}_3^2 \\ 0 & 1/\hat{Z}_3 & -\hat{Z}_2/\hat{Z}_3^2 \end{bmatrix}$$

$$J_\Theta = [\hat{R}_{GC}(\hat{Y} - \hat{T}_{CG})]_x, \text{ and } J_{\delta TCG} = \hat{R}_{GC}$$

and $$\Sigma \eta = J_f [\hat{R}_{GC} \Sigma_Y \hat{R}_{GC}^T] J_f^T + \Sigma_v.$$

The above is applied to all the point correspondences returned as a result of landmark matching, and all the matrices and vectors are stacked to form the final measurement model equation.

Figure 2:
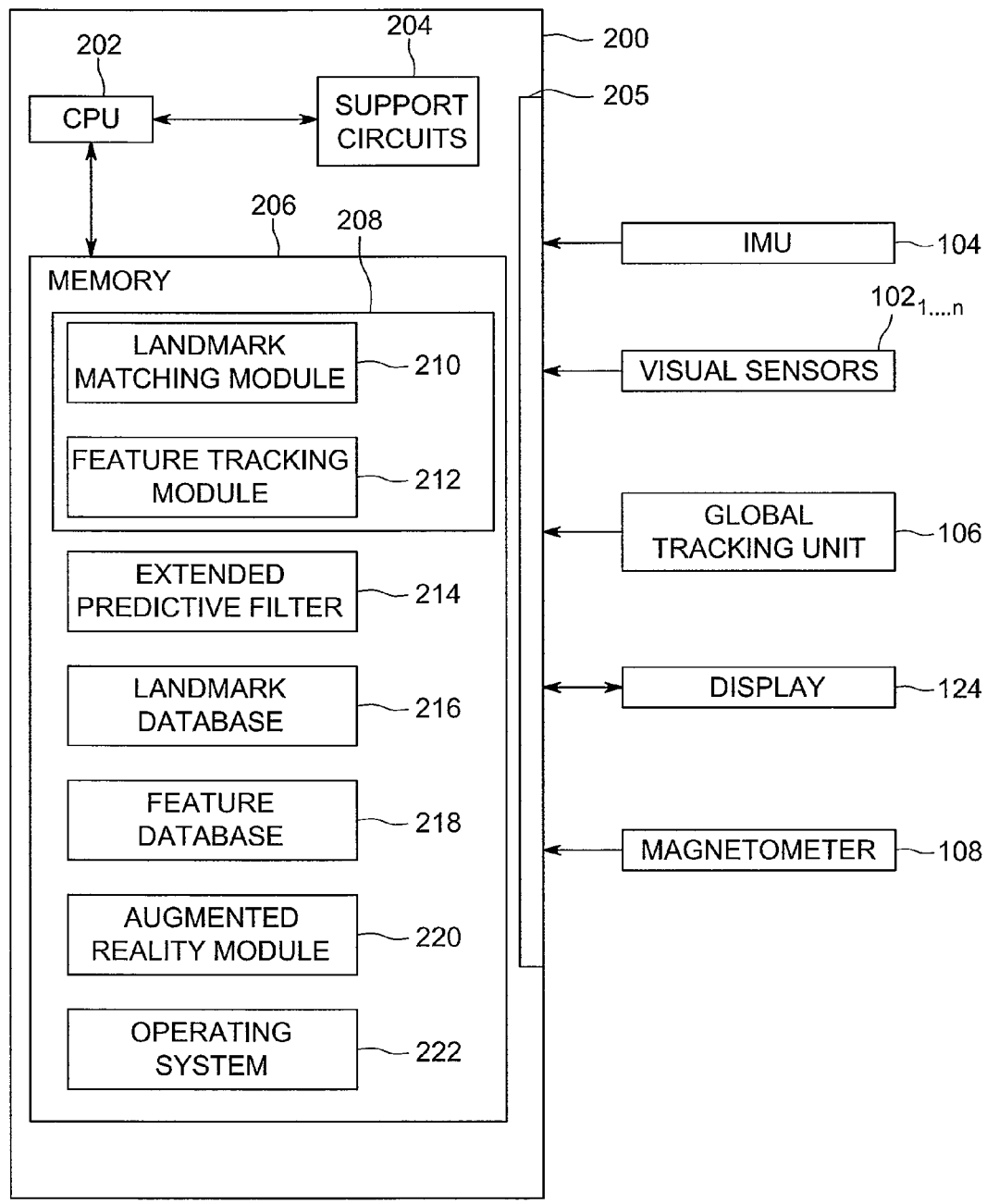
FIG. 2 depicts a block diagram of a computer apparatus for implementing a portion of at least one embodiment of the apparatus in FIG. 1.

FIG. 2 depicts a block diagram of a computer system 200 for implementing a portion of at least one embodiment of the apparatus 100 in FIG. 1. The computer system 200 may be used to implement the feature tracking unit 110, the landmark matcher 112 and the error-state predictive filter 114 of the apparatus 100. The computer system 200 includes a processor 202, various support circuits 204, and memory 206. The processor 202 may include one or more microprocessors known in the art. The support circuits 204 for the processor 202 include conventional cache, power supplies, clock circuits, data registers, I/O interface 205, and the like. The I/O interface 205 may be directly coupled to the memory 206 or coupled through the supporting circuits 204. The I/O interface 205 may also be configured for communication with input devices and/or output devices such as the IMU 104, visual sensors $102_1 \ldots n$, global tracking unit 106, the display 124, the magnetometer 108, network devices, various storage devices, mouse, keyboard, display, and the like.

The memory 206, or computer readable medium, stores non-transient processor-executable instructions and/or data that may be executed by and/or used by the processor 202. These processor-executable instructions may comprise firmware, software, and the like, or some combination thereof. Modules having processor-executable instructions that are stored in the memory 206 comprise a pre-processor 208, an extended error-state predictive filter module 214, a landmark database 216, a feature database 218 and an augmented reality module 220. As described below, in an exemplary embodiment of the pre-processor 208 comprises a landmark matching module 210 and a feature tracking module 212. The computer system 200 may be programmed with one or more operating systems (generally referred to as operating system (OS) 222), which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 222 may be disposed in the memory 206. The memory 206 may include one or more of the following random access memory, read only memory, magneto-resistive read/write memory, optical read/write memory, cache memory, magnetic read/write memory, and the like, as well as signal-bearing media as described below.

Figure 3:
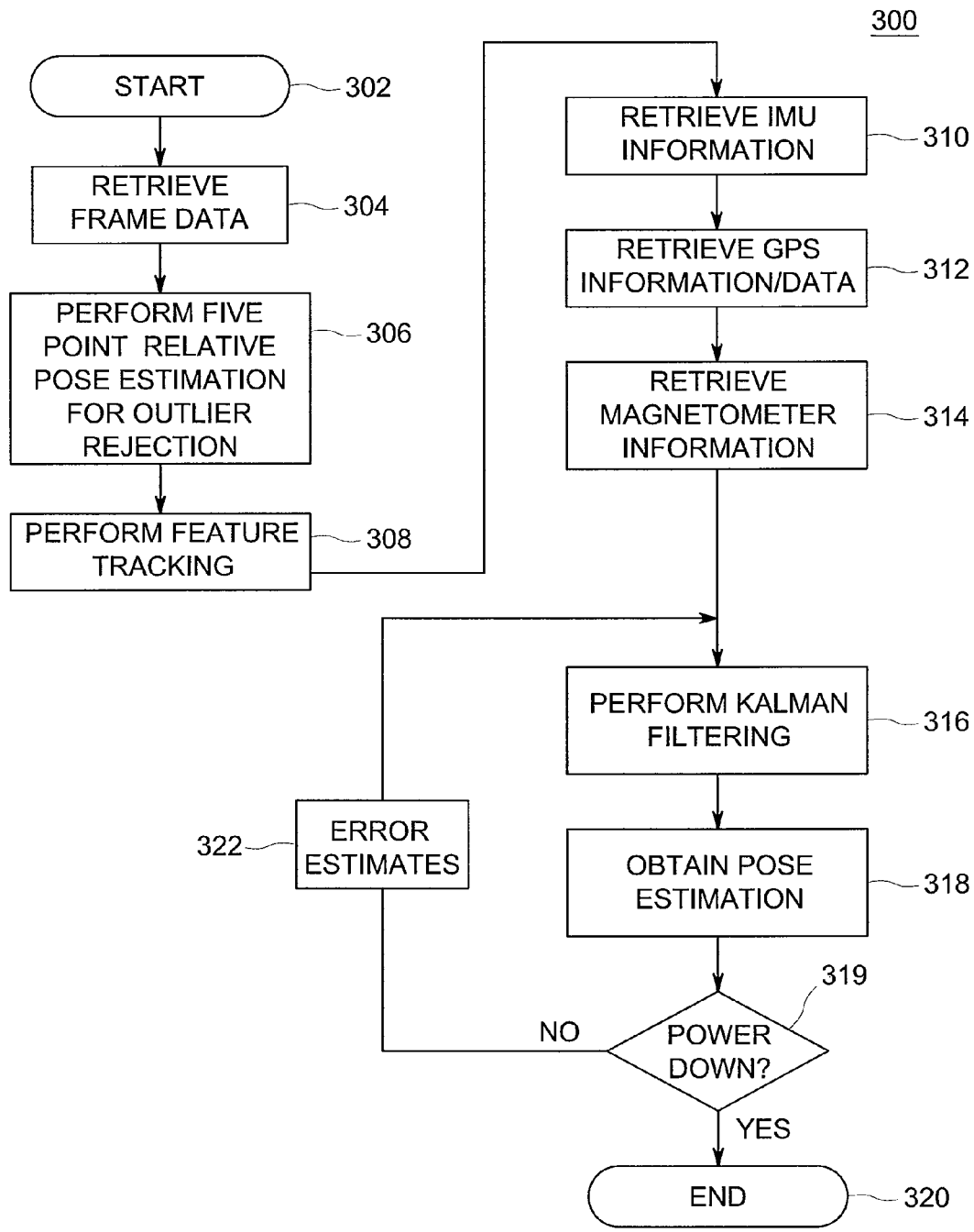
FIG. 3 depicts a flow diagram of a method for generating three-dimensional pose using a monocular visual sensor and an inertial measurement unit in accordance with at least one embodiment of the present invention.

FIG. 3 depicts a flow diagram of a method 300 for generating three-dimensional pose using the apparatus 100 in accordance with at least one embodiment of the present invention. The method 300 represents the execution of the pre-processor 208 stored in memory 206 as executed by processor 202. The method 300 starts at step 302 and proceeds to step 304 where frame data is received. The frame data consists of images of the scene 101, upon which relative measurements are performed as described above. The method then proceeds to step 306 where the frames are feature tracked using five point relative pose estimation, for identifying outlier features in the scene 101. The method then proceeds to step 308 where the inlier feature tracking is performed, rejecting the outlier features. Next, the method 300 retrieves IMU information from IMU 104, receives global location information at step 312 from the global tracking unit 106 and receives magnetic field information at step 314 from magnetometer 108. The error-state predictive filtering is performed at step 316, from which a pose estimation is generated at step 318. At step 319, if it is determined that the device is to be powered down due to any reason, the method ends at step 320. If the device does not need to be powered down at step 319, the error estimate 322 feeds back into the performing of the Kalman filter at step 316.

Figure 4:
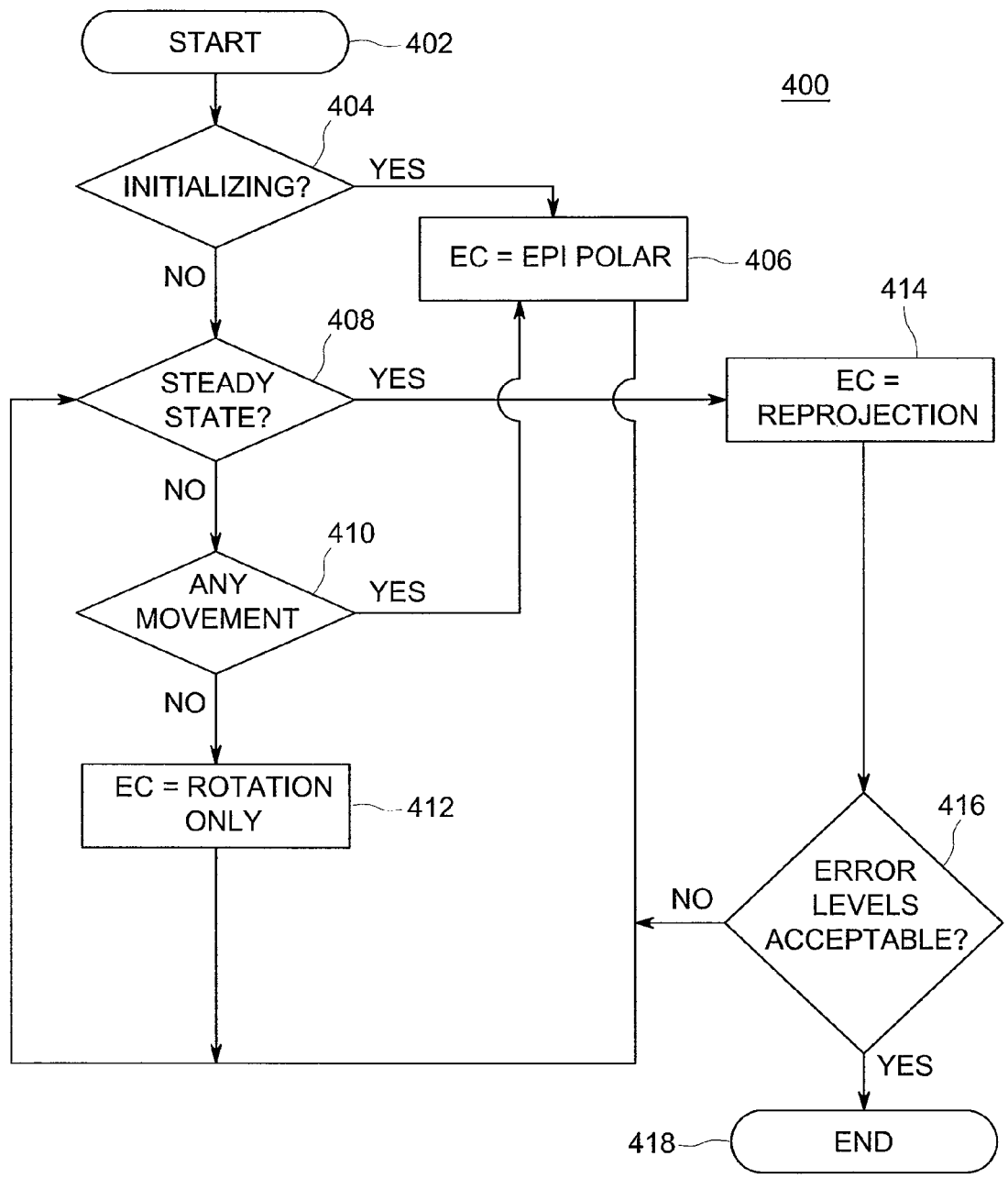
FIG. 4 depicts a flow diagram of a method for assigning error state models in a Kalman Filter in accordance with at least one embodiment of the present invention.

FIG. 4 depicts a flow diagram of a method 400 for assigning error state models in the predictive filter module 114 in accordance with at least one embodiment of the present invention. The method 400 represents the execution of the extended predictive filter module 214 stored in memory 206 as executed by processor 202. The method starts at step 402 and proceeds to step 404. It is determined at step 404 whether the various sensors are in initializing state. If the sensors are in initializing, then the method proceeds to step 406. At step 406, the error constraint model of the Kalman filter is set to the epipolar error model. If the sensors are determined as already having been initialized at step 404, the method proceeds to step 408, where it is determined if the apparatus 100 is in a steady state. If the apparatus is in a steady state, the method proceeds to step 414 where the reprojection error model is used to model error. At step 416, if it is determined that the error levels are acceptable, the method ends at step 418. However, if the error levels are not acceptable, the method proceeds again to step 408 to determine whether the apparatus 100 is in a steady state. If it is determined that steady state does not exist, it is then determined if there is any movement detected at step 410. If movement is detected, the epipolar model is used to estimate pose at step 406. If no movement is detected, the rotational only model for error constraint is used, and the method proceeds again to step 408 to determine if steady state exists. The method ends at step 418 when the reprojection model is being used and the levels are at an acceptable state.

FIG. 5 illustrates the apparatus 100 of FIG. 1 implemented as a mobile device 500 shown in a side view in accordance with at least one embodiment of the present invention. The mobile device 500 comprises a front-facing camera 501 and a back-facing camera 502, a global tracking unit 504, an IMU 506, a magnetometer 508, a memory 510, and a display 512. The global tracking unit 504 is implemented as a GPS unit according to at least one embodiment of the present invention. The mobile device incorporates the Kalman filter module 514 and augmented reality module 516 in memory 510. The augmented reality module alters the display 512 to give contextual information to a user of the mobile device, based on the pose estimation of the device 500.

FIG. 6 illustrates the apparatus 100 of FIG. 1 implemented as the mobile device 500 shown in a frontal view in accordance with at least one embodiment of the present invention. The mobile device 500 illustrated shows one frontal camera 501 which is a single monocular camera, however, other embodiments of the present invention include one or more frontal cameras. The display 512 shows a scene 602 viewed with the rear-facing camera 502 (not shown) overlayed with contextual information, or an augmented reality display. In accordance with one embodiment of the present invention, the augmented reality module 516 displays overlayed text 604 on the scene 602 providing data such as store names, visual identifiers and the like. According to embodiments of the present invention, if a street is being viewed, the street name 606 is overlayed on the scene 602. If a user decides to move the mobile device by, say, rotating it, or translating it, the augmented reality overlays 604 and 606 are altered according to the new pose estimate for the mobile device. For example, if a user moves right, towards the pharmacy, the overlayed text 604 and 606 are also moved according to the motion of the user, in accordance, with at least one embodiment of the present invention.

FIG. 7 illustrates the apparatus 100 of FIG. 1 implemented as the mobile device 500 shown in a rear view in accordance with at least one embodiment of the present invention. The rear-facing cameras $502_1 \ldots 502_n$ are monocular cameras. In addition, in accordance with an exemplary embodiment of the present invention, the mobile device 500 also includes stereo camera 503. Stereo camera 503 and rear-facing monocular cameras $502_1 \ldots 502_n$ are used in conjunction for enhanced pose estimation according to this embodiment of the present invention.

Various elements, devices, modules and circuits are described above in association with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. An apparatus for providing a three-dimensional pose data-stream comprising:
   one or more monocular visual sensors for providing images of an environment surrounding the apparatus;
   an inertial measurement unit (IMU) for providing gyroscope, acceleration and velocity information, collectively referred to as IMU information;
   a feature tracking module for generating feature track information for the images;
   one or more global tracking units for providing global location information; and
   a landmark matcher, coupled to the feature tracking module, for generating an error state derived from comparing feature locations from at least one image to a visual landmark within the environment; and
   an error-state filter, coupled to the feature tracking module, the IMU, the one or more global tracking units, the landmark matcher and the one or more visual sensors, for correcting the IMU information and the global location information and producing a pose estimation based on at least one error-state model chosen according to the images, the IMU information, the global location information and the feature tracking information.

2. The apparatus of claim 1 further comprising:
   a magnetometer unit, coupled to the error-state filter, for providing magnetic field information; and
   wherein the error-state filter also corrects the magnetic field information.

3. The apparatus of claim 2 wherein successive readings of the magnetometer unit are compared to the IMU information and to a nominal magnetic field providing error correction for the error-state filter.

4. The apparatus of claim 2 wherein the global location information is combined with the IMU information for generating an accurate global position and heading fix.

5. The apparatus of claim 4 wherein the accurate global position and heading initializes a global heading direction for the apparatus and a bias for the magnetometer unit.

6. The apparatus of claim 1 wherein the one or more visual sensors comprise one or more monocular cameras and one or more stereo cameras.

7. The apparatus of claim 1 wherein the error-state model of the error-state filter is selected as comprising at least one of an epipolar constraint model, a reprojection constraint model and a rotation-only model, based on parameters provided to the error-state filter.

8. The apparatus of claim 7 where the parameters are at least one of light levels, directional velocity and rotation from the IMU.

9. The apparatus of claim 8 wherein the error-state model is set to the epipolar model when at least one of the light levels are low, the IMU detects a directional velocity, and the apparatus is initializing.

10. The apparatus of claim 8 wherein the error-state model is set to the rotation-only model when only rotation is detected.

11. The apparatus of claim 8 wherein the error-state model is set to the reprojection model when the apparatus is in a steady state which comprises at least one of normal light levels, regular IMU information and apparatus initialization.

12. The apparatus of claim 1 further comprising an output processor for generating, based on the pose estimation, at least one of tracking information or an augmented reality display.

13. The apparatus of claim 1 wherein the apparatus is attached to a mobile device.

14. The apparatus of claim 1 wherein the apparatus is attached to eyewear.

15. The apparatus of claim 1 wherein results of the error-state filter are coupled to the IMU for producing a final error-corrected pose estimation.

16. A computer implemented method for generating a three-dimensional pose estimation comprising:
    sensing images of a surrounding environment using a monocular visual sensor;
    providing gyroscope, acceleration and velocity information, collectively referred to as IMU information;
    providing location information for tracking global coordinates;
    matching the images to visual landmarks; and
    tracking features in the images for providing inliers of the images; and
    generating an error correction for the IMU information and the location information and generating a pose estimation based on the sensed images, the IMU information, the location information and the inliers of the images.

17. The method of claim 16 further comprising:
    measuring and providing magnetic field information; and
    generating the error correction for the magnetic field information.

18. The method of claim 16 wherein the generating a pose estimation comprises selecting between a reprojection model, an epipolar model or a rotation-only model based on light levels and the IMU information.

19. The method of claim 18 wherein the reprojection model is selected when light levels and the IMU information are in a steady state, the epipolar model is selected when light levels are low and the IMU information is providing directional velocity, and the rotational-only model is selected when the IMU information provides zero velocity.

20. The method of claim 19 wherein the pose estimation is coupled with the images of surrounding environment to create an augmented reality display overlaying the images with contextual data.

21. An apparatus for providing a three-dimensional pose data-stream comprising:
    one or more monocular visual sensors for providing images of an environment surrounding the apparatus;
    an inertial measurement unit (IMU) for providing gyroscope, acceleration and velocity information, collectively referred to as IMU information;
    a feature tracking module for generating feature track information for the images;
    an error-state smoother, coupled to the feature tracking module, the IMU and the one or more visual sensors, for correcting the IMU information and producing a pose estimation based on at least one error-state model chosen according to the images, the IMU information and the feature tracking information; and
    wherein the error-state model of the error-state smoother is selected as comprising at least one of an epipolar constraint model, a reprojection constraint model and a rotation-only model, based on parameters provided to the error-state smoother.

22. An apparatus for providing a three-dimensional pose data-stream comprising:
    one or more monocular visual sensors for providing images of an environment surrounding the apparatus;
    an inertial measurement unit (IMU) for providing gyroscope, acceleration and velocity information, collectively referred to as IMU information;
    a feature tracking module for generating feature track information for the images;
    a magnetometer for providing magnetic field information;
    an error-state filter, coupled to the feature tracking module, the IMU, the magnetometer and the one or more visual sensors, for correcting the IMU information and the magnetic field information and producing a pose estimation based on at least one error-state model chosen according to the images, the IMU information, the magnetic field information and the feature tracking information; and
    wherein successive readings of the magnetometer are compared to the IMU information and to a nominal magnetic field providing error correction for the error-state filter.

23. A computer implemented method for generating a three-dimensional pose estimation comprising:
    sensing images of a surrounding environment using a monocular visual sensor;
    providing gyroscope, acceleration and velocity information, collectively referred to as IMU information;
    tracking features in the images for providing inliers of the images;
    generating an error correction for the IMU information and a pose estimation based on the sensed images, the IMU information and the inliers of the images; and
    wherein the generating a pose estimation comprises selecting between a reprojection model, an epipolar model or a rotation-only model based on light levels and the IMU information.

* * * * *